United States Patent [19]

Gatsos

[11] 4,384,497
[45] May 24, 1983

[54] ADJUSTABLE HANDLEBAR SYSTEM

[75] Inventor: Stephen L. Gatsos, Indianapolis, Ind.

[73] Assignee: Indus Wheel Company, a Division of Carlisle Corp., Cincinnati, Ohio

[21] Appl. No.: 184,099

[22] Filed: Sep. 4, 1980

[51] Int. Cl.³ .......................................... B62K 21/16
[52] U.S. Cl. .................................. 74/551.4; 74/531; 74/551.5
[58] Field of Search ................ 74/551.4, 551.5, 531

[56] References Cited

U.S. PATENT DOCUMENTS

| | | | |
|---|---|---|---|
| 570,560 | 11/1896 | McQuown | 74/551.4 |
| 607,876 | 7/1898 | Phipps | 74/551.4 |
| 663,195 | 12/1900 | McQuire | 74/551.5 |
| 2,438,657 | 3/1948 | DuFaux | 74/551.5 |
| 3,249,180 | 5/1966 | Torossian | 74/531 |
| 4,278,032 | 7/1981 | Knitske | 74/531 |

Primary Examiner—Peter M. Caun
Attorney, Agent, or Firm—Barnes & Thornburg

[57] ABSTRACT

An adjustable handlebar system includes handlebar means to provide handle grips for a vehicle that are adapted for movement with respect to the vehicle. At least a pair of unidirectional clutch means control movement of the handlebar means. Each clutch means is engaged with the handlebar means and is connected to a part of the vehicle. The handlebar means and clutch means are interconnected to prevent movement in two opposite directions and to hold the handle grips immovable in the absence of operation of the clutches. One clutch means is operated to permit infinitely variable movement of the handle grips in one direction and the other clutch means is operated to permit infinitely variable movement of the handlebar means in the other direction.

20 Claims, 15 Drawing Figures

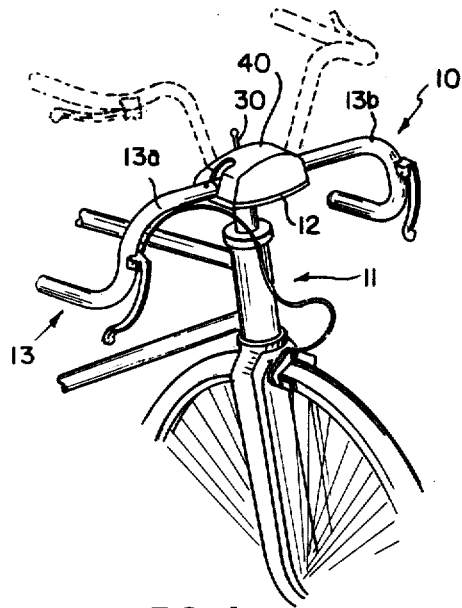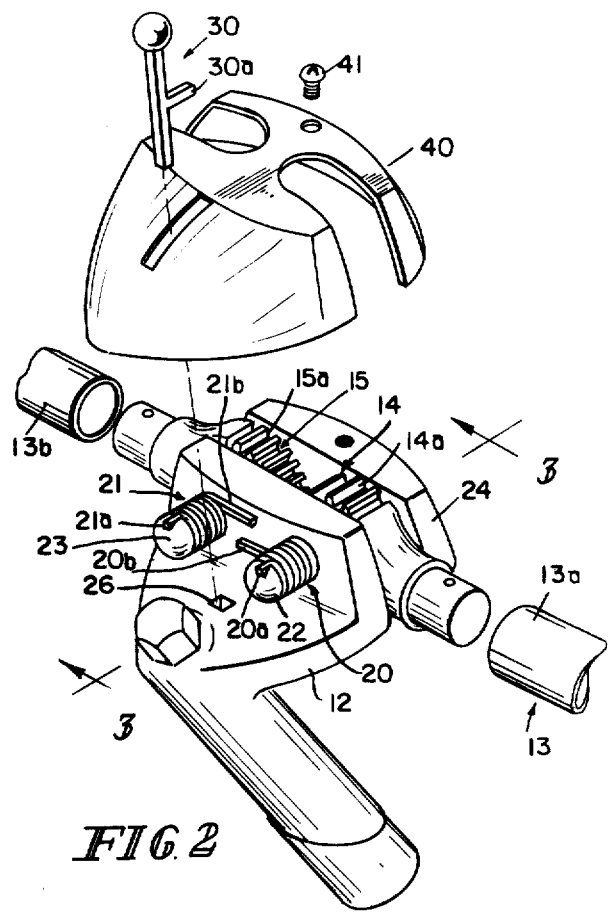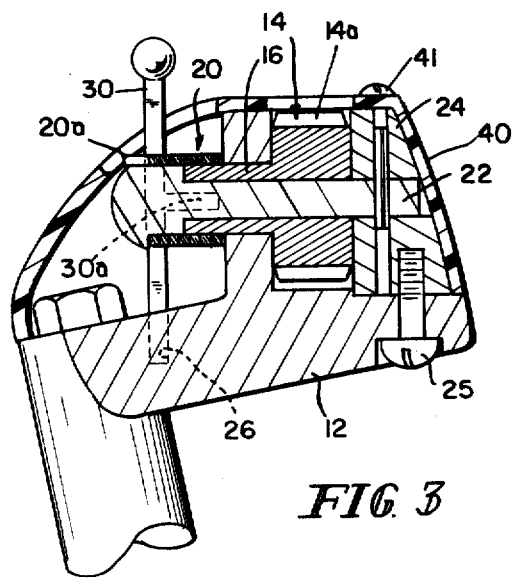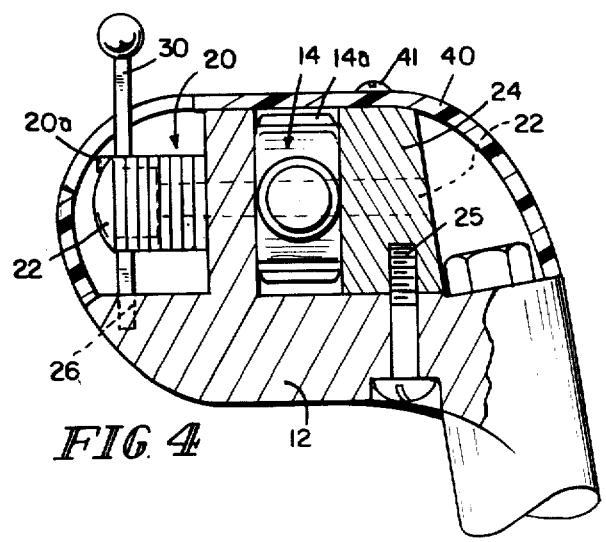
FIG. 1
FIG. 2
FIG. 3
FIG. 4

ADJUSTABLE HANDLEBAR SYSTEM

This invention relates to an improved system to provide convenient and infinitely variable adjustment to the position of handlebars for a vehicle. The invention, for example, permits a bicycle rider to easily and manually, while riding, adjust the position of the grip portions of the handlebars to more relaxing positions.

Bicycling has always been an accepted form of transportation, recreation, and exercise. In the past few years, the use of bicycles has increased; and more and more people, including adults, are riding bicycles as a form of recreation and exercise.

In riding bicycles for extended periods of time, the position of the handle grips with respect to the seat, and thus the position of the rider, should be variable and provide maximum comfort for the rider. In racing bicycles, for example, handlebars are conveniently arranged to cause the rider to bend over and lean forwardly with his arms extending downwardly to provide greater driving power for the rider's legs. However, where the rider is not seeking speed but is riding the bicycle for relaxation and entertainment, the handle grips are desirably located in a position to permit the rider to sit more erectly on the seat. For long rides and to permit the bicycle to be used by a variety of riders, a system providing infinitely variable positions for the handle grips is highly desirable.

Handlebar systems providing a variety of positions for the handle grips are well known. Such systems are disclosed, for example, in U.S. Pat. Nos. 540,879; 549,211; 564,108; 575,266; 578,180; 581,255; 588,242; 610,469; 611,668; 613,014; 635,689; 635,744; 638,427; 661,563; 661,370; 663,195; 677,373; 677,428; 704,159; 774,421; and 2,438,657. These prior systems are complex, requiring expensive interacting gear faces and machined surfaces and generally provide a number of discrete portions of the handlebars determined by the interaction of the machined surfaces of the system parts.

Where the position of the handle grips were infinitely variable, the systems disclosed lacked the simplicity and reliability to render them commercially and economically feasible.

More recent systems to provide adjustment of the handle grips of a bicycle include U.S. Pat. Nos. 3,481,218; 3,505,901; 3,863,521; and French Pat. No. 1,400,484.

The present invention is a significant improvement over such prior art systems. The invention provides handle grips that may be easily shifted to an infinitely variable number of positions and locked securely in place in any such position. In the invention, the adjustable handlebar system includes handlebar means providing handle grips and being adapted for movement with respect to a vehicle. Unidirectional clutch means are provided to interconnect the handlebar means to the vehicle and control the position of the handle grips. Such unidirectional clutch means provides a mechanical interconnection of handlebar means and a portion of the vehicle, such as a bracket, in which the handlebar means may be freely moved in one direction with respect to the vehicle but prevented from movement in the other direction by the unidirectional clutch means.

At least a pair of unidirectional clutch means may be connected with the handlebar means in such a manner that each clutch means interconnects a stationary part of the vehicle and the handlebar means. The pair of clutch means are arranged to prevent movement of the handlebar means in the two opposite directions to hold the handlebar means immobile in the absence of operation of the clutch means. Operation of one clutch means will permit infinitely variable adjustment of the handlebar means in one direction, and operation of the other clutch means will permit infinitely variable movement of the handlebar means in the other direction. In the absence of operation of either clutch, the handlebar means are securely maintained in their adjusted position.

A number of embodiments of the present invention are possible. For example, the handlebar means can include a pair of handlebars connected together at their ends opposite the grips by a pair of engaged gear surfaces to which the pair of handlebars is securely fastened. Each of the gear surfaces can be fixed to one of a pair of gear shafts that are rotatably carried by a bracket. One clutch means can be connected with one of the gear shafts to permit rotation of the gear shaft in one direction but to prevent rotation of the gear shaft in the other direction, and a second clutch means can be connected with the other gear shaft to permit rotation of the other gear shaft in the one direction but to prevent rotation of the other gear shaft in the other direction. Through the engagement of the gear surfaces, movement of the handlebars is prevented without operation of one of the clutch means. With operation of one clutch means, and through the engagement of the gear surfaces, simultaneous adjustment of the handlebars in one direction is permitted; and with the operation of the second clutch means, through the engagement of the gear surfaces, simultaneous adjustment of the handlebars in the other direction is possible.

A lever may be movably carried by the bracket and adapted to engage operating tabs for each clutch means so that movement of the lever in one direction will result in engagement and operation of the operating tab of one clutch means and movement of the lever in the other direction will result in engagement and operation of the operating tab of the other clutch means.

In another embodiment, the handlebar means includes a pair of handlebars; and each handlebar is carried at the end opposite the handle grips by handlebar shaft means. The bracket includes a plurality of portions to carry the handlebar shaft means. The unidirectional clutch means includes a first and second pair of unidirectional clutch means. The first pair of clutch means is carried about the axis of the handlebar shaft means with one of the first pair of clutch means preventing movement of the first handlebar in one direction, and the other of the first pair of clutch means preventing movement of the first handlebar in the other direction. The second pair of clutch means is carried about the axis of the handlebar shaft means with one of the second pair of clutch means preventing movement of the second handlebar in one direction and the other of the second pair of clutch means preventing movement of the handlebar in the other direction. The system includes means to operate each of the clutch means to permit independent and infinitely variable adjustment of the handlebar means about the handlebar shaft means.

Such latter embodiments can include a pair of first and second handlebars with each handlebar being fastened at the end opposite the handle grips to first and second handlebar shafts, respectively. The bracket can include first and second wall means forming a U-shaped bracket to carry the first and second handlebar shafts with the first and second handlebar shafts extending through the first and second walls. The first pair of unidirectional clutch means can be carried about the axis of the first handlebar shaft, with one of the first pair of clutch means interconnecting the first wall of the bracket and the first handlebar shaft to prevent movement of the first handlebar in one direction and with the other of the first pair of clutch means interconnecting the second wall of the bracket and the first handlebar shaft to prevent movement of the first handlebar in the other direction. The second pair of unidirectional clutch means can be carried about the axis of the second handlebar shaft, with one of the second pair of clutch means interconnecting the first wall of the bracket and the second handlebar shaft to prevent movement of the second handlebar in one direction and with the other of the second pair of clutch means interconnecting the second wall means and a second handlebar to prevent movement of the second handlebar in the other direction.

Such embodiments can be operated to permit independent and infinitely variable adjustment of each of the first and second handlebars about the central axes of the first and second handlebar shafts by either four push buttons carried by the bracket so each push button will engage an operating tab projecting from each of the clutch means, or by an operating bar which operates the clutch means in pairs.

In such a latter system, the first and second handlebar shafts can be carried by the first and second walls of the bracket in spaced relationship so that their central axes are parallel. The first and second walls of the bracket can form a pair of aligned openings lying on an axis that is parallel and between the axes of the first and second handlebar shafts. Each clutch means of the first and second pair of clutch means can include an operating tab extending outwardly from the clutch in spaced relationship with the aligned openings of the first and second walls of the bracket. The clutch means can be operated by an operating bar carried in the aligned openings of the first and second walls of the bracket. The operating bar can be provided with first and second pairs of surfaces to operate the operating tabs of the clutch means. The first and second pairs of operating surfaces can be located so that the movement of the operating bar in one direction within the aligned openings moves the first pair of operating surfaces to engage one clutch means of the first handlebar shaft and one clutch means of the second handlebar shaft to permit the first and second handlebars to be raised together, and so that movement of the operating bar in the other direction within the aligned openings moves the second pair of operating surfaces to engage the other clutch means on the first and second handlebar shafts to permit the first and second handlebar shafts to be lowered together.

The unidirectional clutch means preferably employed with this invention are one-way, spring-wrap clutches. A spring-wrap clutch means is adapted to control a rotating part through surface engagement. The spring-wrap clutch means and the part can be moved relative to each other in the direction in which the spring and the part are disengaged, i.e., where the spring clutch means is wrapped around the part it controls, in the direction that tends to unwind or loosen the spring. The spring and the part cannot, however, be moved relative to each other in the other direction in which the engagement of the spring and the part becomes greater, i.e., where the spring clutch means is wrapped around the part it controls, in the direction that tends to wind the spring more tightly about the part and thereby increase its grip on the part. Spring-wrap clutch means can thus permit rotation in one direction and prevent rotation in the opposite direction, permitting their use as unidirectional, one-way clutches. In their use, one end of the spring may be fastened to a stationary part with the other end being wound around and frictionally engaging a rotatable part, or one end of the spring may be fastened to the rotatable part with the other end wound around and frictionally engaging the stationary part. In addition, the spring-wrap clutch means may engage a surrounding part with its outer surface. In any such arrangement, the spring-wrap clutch can be effective in permitting relative rotation of two parts in one direction while preventing relative rotation of the parts in the other direction.

In the one-way, spring-wrap clutch, an operating tab is provided at the end of the clutch which engages, but is not fastened to, a part; and the grip of the clutch is released by slight movement of the operating tab in a direction to loosen the spring wrap from the adjacent part and permit movement of the part free of frictional engagement by the clutch. The handlebar means, or the shafts or elements to which such means may be fastened, are typically carried by a bracket adapted for fastening to the vehicle so that handlebar means, or such shafts or element, rotate with respect to the bracket. The one-way, spring-wrap clutches can be used to interconnect the handlebar means, or the handlebar shafts or elements and the bracket as shown and described.

Other specific embodiments will become apparent from the drawings and specific description which follow. In the drawings:

FIG. 1 is a partial view of a bicycle with an adjustable handlebar system of this invention;

FIG. 2 is an exploded view of an embodiment of an adjustable handlebar system of this invention;

FIG. 3 is a sectional view taken along lines 3—3 of FIG. 2;

FIG. 4 is a cross-sectional view illustrating an embodiment similar to that shown in FIG. 2 in which the system projects rearwardly from the axle on which the front wheel of the bicycle is mounted;

Figures 5, 11:
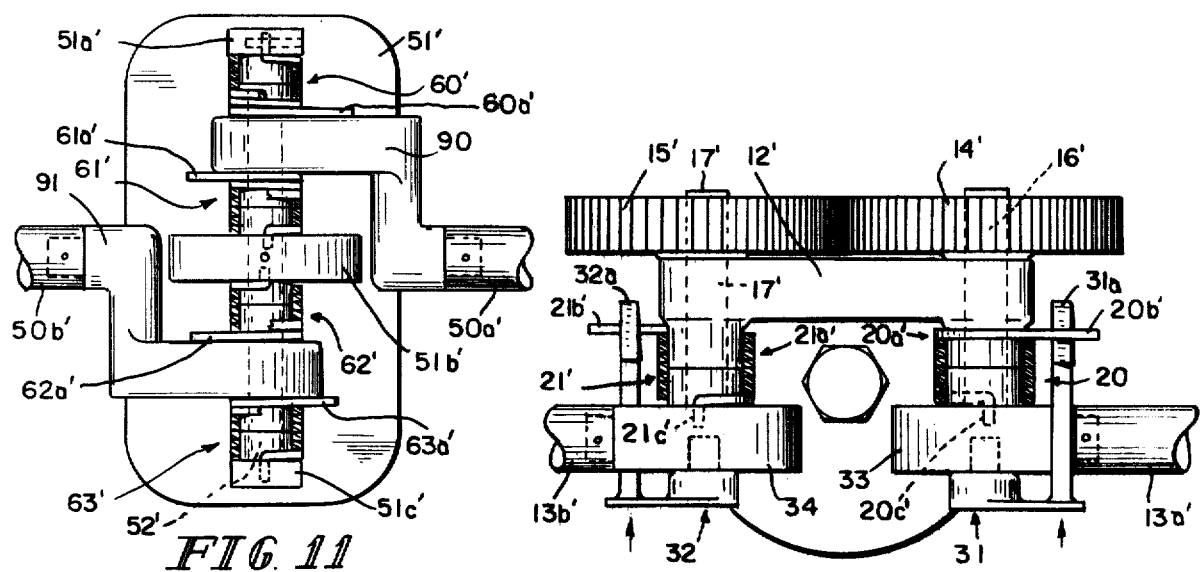
FIG. 5 is a plan view showing another embodiment of the invention.
FIG. 11 is a partial plan view of another embodiment of the invention utilizing four independent clutch means.

Referring now to FIG. 1, an adjustable handlebar system in this invention is shown on a bicycle 11. Although FIG. 1 shows the adjustable handlebar system 10 on a bicycle, the invention is adapted for use on other vehicles where adjustability of the position of handle grips is desirable. The system includes a bracket 12 adapted to be fastened to the vehicle and means to provide handle grips for the vehicle which may include a pair of handlebars 13a and 13b, as shown in FIG. 1, or a single handlebar 13 as shown in FIG. 13.

Figure 12:
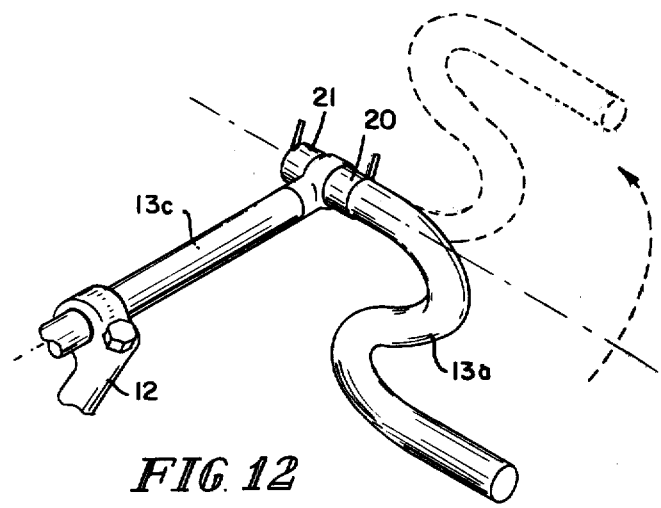
FIG. 12 is a partial perspective view of another embodiment of the invention.

In the system of this invention, the handle grips at the ends of the handlebars may be fastened in an infinite variety of positions by movement of the handlebar 13 or handlebars 13a and 13b. For example, as shown in FIG. 1, handlebars 13a and 13b may be raised to the position shown in the dotted lines of FIG. 1 or to any positions intermediate the positions shown in solid lines and those shown in dotted lines. In the embodiments shown in FIG. 12 and FIG. 13, the handle grip portion of the handlebar 13 may be adjusted to any position by rotating the handlebar 13 about the axis of rotation 13c. In accordance with the invention, the handle grips are secured in a selected position; and adjustability to an infinite variety of positions is achieved through the use of at least a pair of unidirectional clutches 20 and 21 which are shown to be one-way, spring-wrap clutches.

Figure 13:
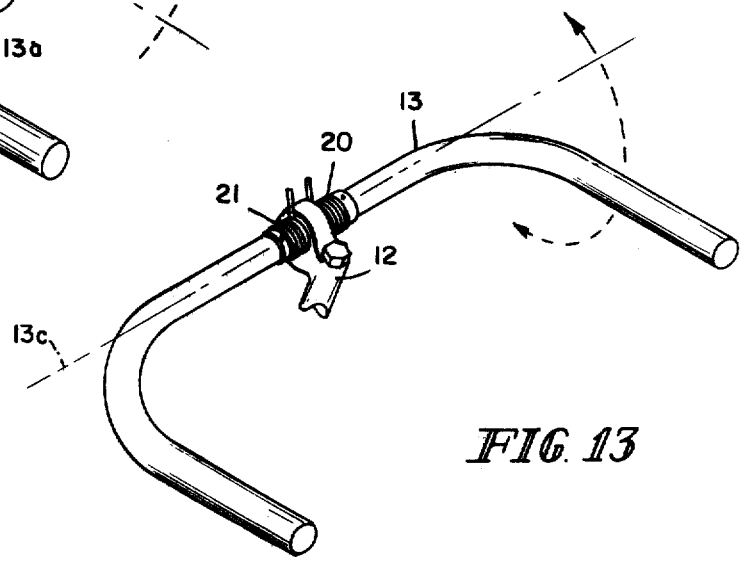
FIG. 13 is a partial perspective view showing another embodiment of the invention.

In the embodiment shown in FIGS. 1-4 and FIG. 13, the adjustable handlebar system permits a simultaneous adjustment of both hand grips. In such a system, each unidirectional clutch means 20 and 21 is connected with the handlebar means 13, 13a, 13b. Each clutch means 20 and 21 is fastened to a stationary part of the vehicle, such as bracket 12, and permits, upon operation of one clutch means, infinitely variable movement of the handlebar means in one direction and, upon operation of the other clutch, infinitely variable movement of the handlebar means in the other direction. The pair of clutch means holds the handlebar means immovable in the absence of operation of the clutches. Thus, operation of one clutch means can permit simultaneous raising of the handle grips, as shown in FIGS. 1 and 13 and operation of the other clutch means can permit simultaneous lowering of the handle grips. The clutch means 20 and 21, in the absence of operation, grip the bracket 12 and the handlebar means 13, 13a, and 13b, and prevent movement of the handle grips.

Turning now to the specific embodiment shown in FIGS. 1-4, the handlebar means includes a pair of handlebars 13a and 13b connected together at the ends opposite the handle grips by a pair of engaged gear surfaces 14 and 15. The teeth 14a, 15a of gears 14, 15 are engaged so that the handlebars 13a and 13b move simultaneously in opposite directions of rotation; i.e., when handlebar 13a moves clockwise, handlebar 13b moves counterclockwise and vice versa. Each of the gears 14 and 15 is fixed to a gear shaft 16 and 17 (not shown), in the manner shown in FIG. 3 for shaft 16. The gears and gear shafts are carried by the bracket 12 so that they are free to rotate about the axes about which the teeth of the gear surfaces are arranged. A pair of clutch means 20, 21 are used to control the adjustment of the handlebars 13a and 13b and to secure the handle grips in a fixed position upon completion of their adjustment. One clutch means 20 is carried about and engages gear shaft 16 of gear 14 and is fastened to stationary axle 22 held by bracket 12, to permit rotation of the gear shaft 16 and handlebar 13a in one direction (e.g., counterclockwise as viewed in FIG. 2), but will prevent the shaft 16 from rotating in the other direction (e.g., clockwise as viewed in FIG. 2). The other clutch means 21 is carried about and engages the gear shaft 17 (not shown) of gear 15 and is fastened to stationary axle 23, also held by bracket 12. The other clutch means 21 also permits rotation of the gear shaft 17 (not shown) in the other direction (e.g., counterclockwise as viewed in FIG. 2) while preventing rotation of gear 15 and the handlebar 13b in the opposite direction (e.g., clockwise as viewed in FIG. 2). However, the gears 14 and 15 and handlebars 13a and 13b are limited to rotation in opposite directions because of the engagement of gear teeth 14a and 15a. Thus, in the absence of operation of either clutch means 20 or 21, the handlebars 13a and 13b are secured in immovable positions because of the engagement of the teeth of gears 14 and 15. Upon the operation, for example, of clutch means 21, clutch means 21 is disengaged from shaft 17 permitting rotation of gear 15 clockwise and permitting handlebar 13b to be raised. Through the engagement of the gear surfaces 14 and 15, handlebar 13a is simultaneously raised since clutch means 20 does not prevent its movement in the counterclockwise direction. When it is desired to lower the handle grips, clutch means 20 is operated, permitting gear 14 to move in a clockwise direction; and through the engagement of the gears 14 and 15, handlebar 13b is moved in a counterclockwise direction because clutch means 21 does not prevent such movement.

The system includes means to operate the clutch means. In the embodiments shown, the clutch means 20 and 21 are one-way, spring-wrap clutches carried about the shafts of gears 14 and 15 and fastened at their ends at 20a and 21a to the stationary axles 22 and 23 carried on the bracket 12 and bracket portion 24, as shown in FIGS. 2 and 4. Bracket portion 24 is fastened to bracket 12 by means of a threaded fastener 25. Operating tabs 20b and 21b project outwardly (generally radially) from one-way, spring-wrap clutches 20 and 21. A lever 30 is movably carried in an opening 26 formed in bracket 12 and is adapted to engage, for example, at 30a, the operating tabs 20b and 21b of one-way, spring-wrap clutches 20, 21. A cover plate 40 is fastened to bracket portion 24, for example, by screws 41, as shown in FIGS. 2-4, and retains lever 30 in the system with its operating tab-engaging portion 30a trapped between operating tabs 20b and 21b of the clutch means 20 and 21. Thus, when adjustment of the handle grips is desired, lever 30 is moved either downwardly or upwardly, respectively, depending upon whether or not it is desired to raise or lower the handle grips.

Another and similar embodiment is shown in FIG. 5. Rather than including specially formed elements with gear surfaces 14 and 15 formed with teeth 14a and 15a and portions 14b and 15b adapted to receive handlebars 13a and 13b, as shown in FIG. 1, the embodiment of FIG. 5 uses a pair of spur gears 14' and 15' carried on a pair of shafts 16' and 17' having parallel central axes that extend through bracket 12'. The clutch means 20' and 21' are carried about the central axes of shafts 16' and 17', respectively. The clutches 20' and 21' engage a part of bracket 12' at their respective ends 20a' and 21a' and are fastened to the rotating handlebar supports 33 and 34 at their opposite ends 20c' and 21c'. Operating tabs 20b' and 21b' project outwardly from the clutch means 20' and 21'. Clutch means 20' is assembled into the system to permit rotation of gear 14', handlebar support 33, and handlebar 13a' clockwise but to prevent their rotation counterclockwise. Clutch means 21' is assembled into the system to permit rotation of gear 15', handlebar support 34, and handlebar 13b' clockwise while preventing their rotation counterclockwise. Because of the engagement of the teeth of spur gears 14' and 15' and the absence of operation of clutch means 20' and 21', the handlebars 13a' and 13b' are immobile; and the position of the handle grips is secure.

The system of FIG. 5 includes a pair of tab operators 31 and 32 adjacent on the central axes of the shafts 16' and 17' and handlebar supports 33 and 34. Tab operators 31 and 32 are carried so that they are free to slide back and forth along, and to rotate about, the central axes of shafts 16' and 17' and are retained on the central axes of these shafts by any convenient fashion, such as two fasteners through a central bore of the tabs or the like. Each of tab operators 31 and 32 include a tab-operator portion 31a and 32a, respectively. When it is desired to adjust the position of the handle grips, tab operator 31 or tab 32, depending upon the selection made, is pushed so that it slides along the axis of the shaft on which it is mounted to operate portions 20b' or 21b' of clutches 20' or 21', respectively. The selected clutch means is, thus, disengaged, permitting the handlebars 13a, 13b to be moved simultaneously as desired, either upwardly or downwardly to a new position.

Other embodiments of the invention are shown in FIGS. 6–11. In such adjustable handlebar systems, the handlebar means includes a pair of handlebars such as first handlebar 50a and second handlebar 50b forming handle grips at their ends which are not shown. The bracket 51, adapted to be connected to the vehicle, includes a plurality of portions to carry handlebar shaft means. A first pair and a second pair of unidirectional clutch means are used to control the adjustment of the handlebars 50a and 50b. Preferably the unidirectional clutch means includes a first and second pair of one-way, spring-wrap clutches. The first pair of such clutch means is carried about the axis of the handlebar shaft means, with one of the first pair of clutch means interconnecting a portion of the bracket and said first handlebar to permit movement of the first handlebar in one direction and to prevent movement of the first handlebar in the other direction, and with the other of said first pair of clutch means interconnecting a portion of the bracket and said first handlebar to prevent movement of the handlebar in one direction and to permit movement of the first handlebar in the other direction. The second pair of clutch means is also carried about the axis of the handlebar shaft means, with one of the second pair of clutch means interconnecting a portion of the bracket and the second handlebar to permit movement of the second handelbar in one direction and to prevent movement of the second handlebar in the other direction, and with the other of the second pair of clutch means interconnecting a portion of the bracket and the second handlebar means to prevent movement of the second handlebar in one direction and to permit movement of the second handlebar in the other direction. The system includes means to operate each of the clutch means to permit independent and infinitely variable adjustment of each of the first and second handlebars about the handlebar shaft means. Embodiments of such systems are shown, for example, in FIGS. 6–11.

Figure 6:
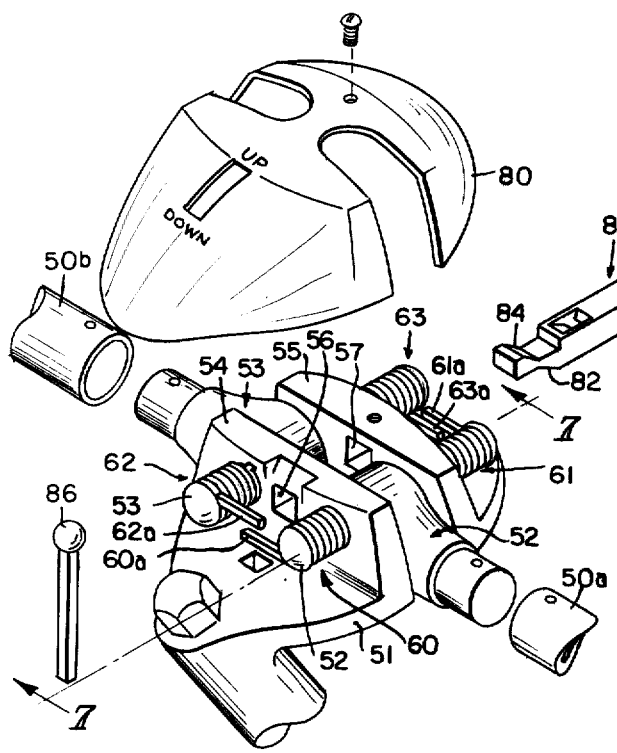
FIG. 6 is an exploded view of another embodiment of the invention.
Figure 7:
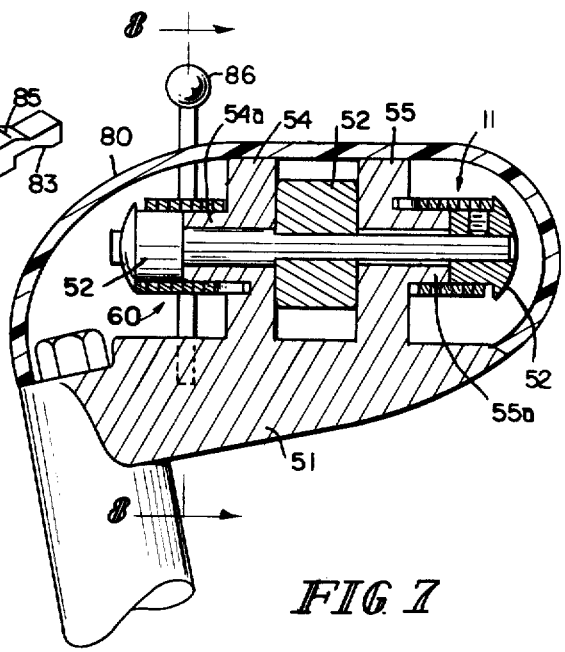
FIG. 7 is a sectional view along the lines 7—7 of FIG. 6.
Figure 8:
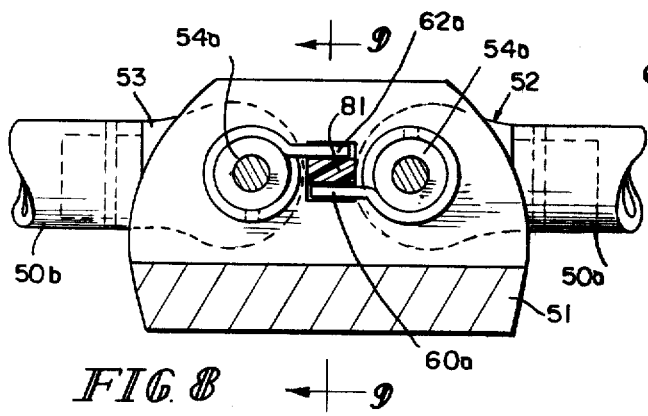
FIG. 8 is a sectional view taken along lines 8—8 of FIG. 7, looking right from line 8—8 at the left of FIG. 7.

Referring to the specific embodiment shown in FIGS. 6–9, a first handlebar 50a and a second handlebar 50b form the handlebar means. The first and second handlebars 50a and 50b are fastened at their ends opposite the handle grips to first and second handlebar shafts 52 and 53, respectively, which form the handlebar shaft means, as shown in FIG. 8. The bracket 51 includes first and second walls 54 and 55 forming a U-shaped portion to carry handlebar shafts 52 and 53 so that they are free to rotate within the U-shaped portion about their central axes. The handlebar shafts 52 and 53 extend outwardly through the first and second walls 54 and 55. A pair of unidirectional clutch means, first pair 60 and 61, and second pair 62 and 63, are provided about each handlebar shaft 52 and 53, respectively. The first pair of one-way, spring-wrap clutches 60 and 61 is carried about the axis of the first handlebar shaft 52 with one clutch 60 of the first pair of clutch means being fastened to the first wall 54 of the bracket and engaging the first handlebar shaft 52 to prevent movement of the first handlebar 50a and shaft 52 in one direction. The other clutch 61 of the first pair of clutch means is fastened to the second wall 55 of the bracket and engages the first handlebar shaft 52 to prevent movement of the first handlebar 50a and shaft 52 in the other direction. The first and second walls 54 and 55 may be provided with projecting, annular boss portions 54a and 55a for engagement by clutch means 60 and 61, respectively. The second pair of clutch means 62 and 63 are carried about the axis of the second handlebar shaft 53 with one clutch 62 of the second pair of clutch means being fastened to the first wall 54 of the bracket and engaging the second handlebar shaft 53 (not shown) to prevent movement of the second handlebar 50b and shaft 53 in one direction and the other clutch 63 being fastened to the second wall 55 of the bracket and engaging the second handlebar shaft 53 (not shown) to prevent movement of the second handlebar 50b and shaft 53 in the other direction. The bracket may be provided with annular, projecting boss portions about the bore carrying handlebar shaft 53 in the same manner as shown in FIG. 7.

Figure 10:
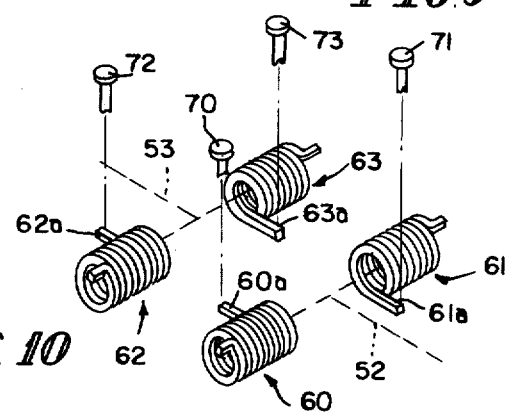
FIG. 10 is an exploded view of another embodiment of the invention of FIG. 6, illustrating independent push buttons to operate independently the clutch means shown in FIG. 6.

Means may be provided to operate each of the clutch means 60, 61, 62, and 63 independently to permit independent and infinitely variable adjustment of each of the first and second handlebars 50a and 50b about the first and second handlebar shafts 52 and 53. In such means, the one-way, spring-wrap clutch means 60, 61, 62, and 63, as indicated in FIG. 10, may include operating tabs 60a, 61a, 62a, and 63a, respectively, projecting therefrom, and adapted for operation by, a plurality of push buttons 70, 71, 72, and 73. The push buttons 70, 71, 72, and 73 may be mounted in and carried by a housing (similar to housing 80 shown in FIG. 6) adapted to retain the push buttons therein and to position them for engagement and operation of the tabs 60a, 61a, 62a, and 63a of the four clutch means.

Figure 9:
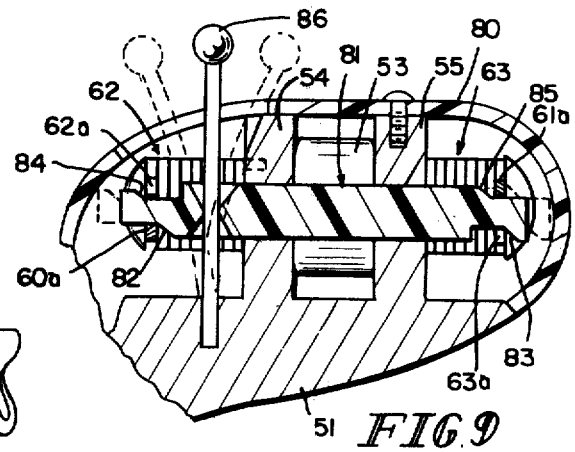
FIG. 9 is a sectional view taken along lines 9—9 of FIG. 8.

The embodiment shown in FIGS. 6–9 includes means to operate the clutch means in pairs to permit the handle grips to be raised simultaneously, but independently one from the other, or to permit the handle grips to be lowered simultaneously, but independently one from the other. In this embodiment, as shown in FIG. 6, the first and second handlebar shafts 52 and 53 are parallel and are carried by the first and second walls 54 and 55 of the bracket 51 in spaced relationship. The first and second walls 54 and 55 of the bracket 51 form a pair of aligned openings 56 and 57 lying on an axis that is parallel to the axes of the first and second handlebar shafts 52 and 53 and located intermediately therebetween. The operating tabs 60a, 61a, 62a, and 63a extend outwardly from the clutch means. The clutch-operating means includes an operating bar 81 carried in the aligned openings 56 and 57 and an operator lever 86 engaging the operating bar 81, as shown in the sectional view 9. The operating bar has a first pair of operating surfaces 82 and 83 and a second pair of surfaces 84 and 85. As shown, the operating surfaces may be ramps located on both sides of the operating bar 81. The operating surfaces are located so that movement of the operating bar in one direction in the aligned openings (for example, to the left as shown in FIG. 9) moves the first pair of ramp-operating surfaces 82 and 83 to engage operating tabs 60a and 63a, respectively, to permit a clockwise rotation of shaft 52 and the counterclockwise rotation of shaft 53 (as viewed in FIG. 6), thereby permitting the first handlebar means 50a to be lowered and the second handlebar means 50b to be lowered, each independently of the other, to a position chosen by the rider. When the operating bar 81 is moved in the opposite direction (as, for example, to the right as shown in FIG. 9), the second pair of ramp-operating surfaces 84 and 85 engage respectively operating tabs 62a and 61a operating clutches 61 and 62, thereby permitting shaft 52 to be moved in a counterclockwise direction and handlebar 50a to be raised while simultaneously, but independently, permitting the rotation of shaft 53 in a clockwise direction and handlebar 50b to be raised. When adjustment of the handle bars is desired, lever 86 is moved downwardly or upwardly depending upon whether or not it is desired to raise or lower the handle grips.

In the embodiment of FIG. 11, the first and second handlebars 50a and 50b are mounted on common handlebar shaft means 52' by a pair of handlebar supports 90 and 91 rotatably carried by the handlebar shaft 52'. The handlebar supports 90 and 91 each have two projecting annular boss portions, one on each side about the opening formed therein for the handlebar shaft means 52'. The bracket 51' includes a plurality of portions 51a', 51b', and 51c', and the shaft 52' is carried by bracket portions 51a', 51b', and 51c'. The four one-way clutch means 60', 61', 62', and 63', which are preferably one-way, spring-wound clutches are carried out handlebar shaft means 52'. A first pair of clutch means 60' and 61' are fastened to bracket portions 51a' and 51b' and engage the annular boss portions of handlebar support 90, one clutch 60' permitting rotation of support 90 and handlebar 50a' in one direction while preventing rotation of support 90 and handlebar 50a' in the other direction, and the other clutch 61' preventing rotation of support 90 and handlebar 50a' in one direction and permitting rotation of support 90 and handlebar 50a' in the other direction. The second pair of clutch means 62' and 63' are likewise fastened to bracket portions 51b' and 51c' and engage the annular boss portions of handlebar support 91, one clutch 62' permitting rotation of support 91 and handlebar 50b' clockwise while preventing rotation of support 91 and handlebar means 50b' counterclockwise and the other clutch 63' preventing rotation of the support 91 and handlebar 50b' clockwise while permitting rotation of the support 91 and handlebar 50b' counterclockwise. Thus, operation of each of the clutch means 60', 61', 62', and 63' will permit movement of one of the handlebar means 50a' or 50b' in a specific direction as desired. Means may be provided, for example, as shown and described with respect to FIG. 10, to independently operate the operating tabs 60a', 61a', 62a', and 63a' of FIG. 11.

Figure 14:
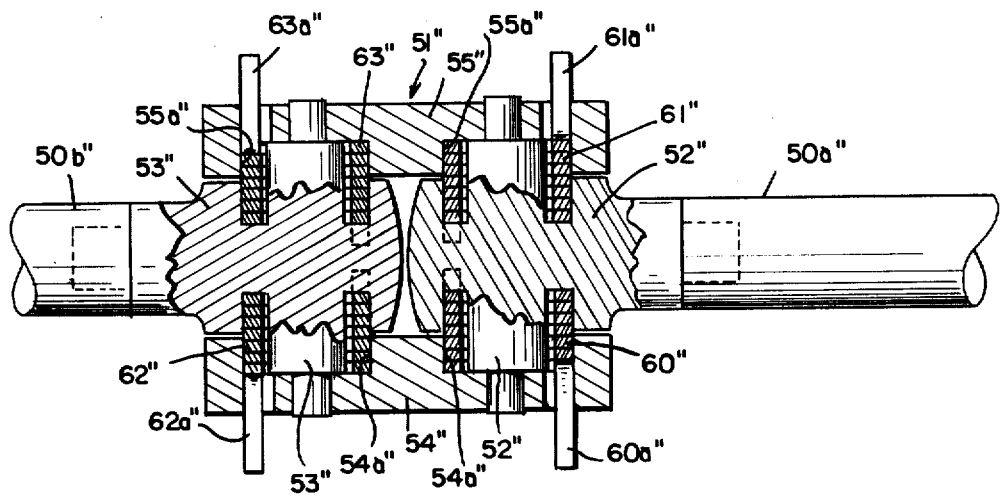
FIG. 14 is a partial cross-sectional view of another embodiment of the invention.
Figure 15:
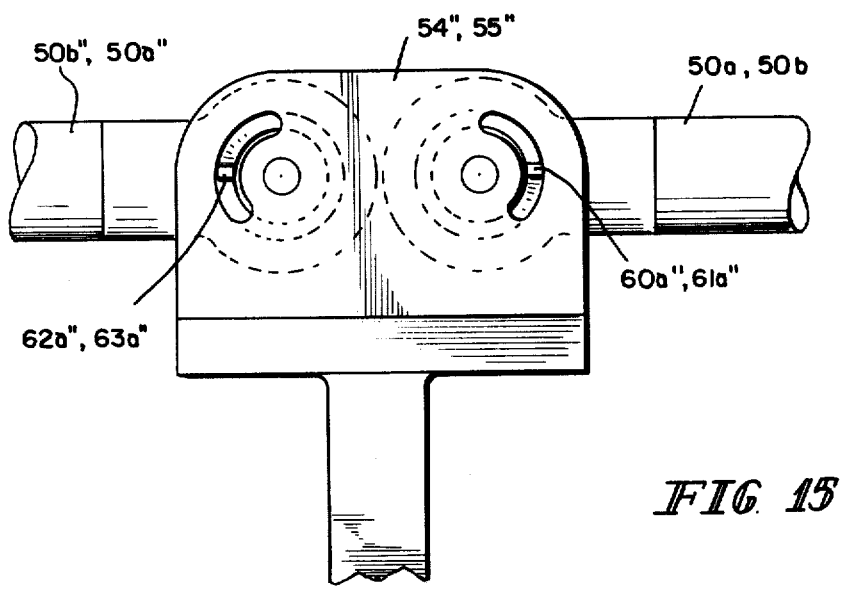
FIG. 15 is a view of the embodiment of FIG. 14, taken from either the right or the left.

The specific embodiment shown in FIGS. 14 and 15 is like the embodiment shown in FIGS. 6-9 except the outer surfaces of the spring-wrap clutch means are used for engagement. A first handlebar 50a'' and a second handlebar 50b'' form the handlebar means. The first and second handlebars 50a'' and 50b'' are fastened at their ends opposite the handle grips to first and second handlebar shafts 52'' and 53'', respectively, which form the handlebar shaft means. The bracket 51'' includes first and second walls 54'' and 55'' forming a U-shaped portion to carry handlebar shafts 52'' and 53'' so that they are free to rotate within the U-shaped portion about their central axes. The handlebar shafts 52'' and 53'' extend outwardly through the first and second walls 54'' and 55''. A pair of unidirectional clutch means, first pair 60'' and 61'', and second pair 62'' and 63'', are provided about each handlebar shaft 52'' and 53'', respectively. The first pair of one-way, spring-wrap clutches 60'' and 61'' is carried about the axis of the first handlebar shaft 52'' with one clutch 60'' of the first pair of clutch means being fastened to the first handlebar shaft 52'' and engaging the first wall 54'' of the bracket to prevent movement of the first handlebar 50a and shaft 52'' in one direction. The other clutch 61'' of the first pair of clutch means is fastened to the first handlebar shaft 52'' and engages the second wall 55'' of the bracket to prevent movement of the first handlebar 50a and shaft 52'' in the other direction. The first and second walls 54'' and 55'' may be provided with inner cylindrical surface portions 54a'' and 55a'' for engagement by clutch means 60'' and 61'', respectively. The second pair of clutch means 62'' and 63'' are carried about the axis of the second handlebar shaft 53'' with one clutch 62'' of the second pair of clutch means being fastened to the second handlebar shaft 53'' and engaging the first wall 54'' to prevent movement of the second handlebar 50b'' and shaft 53'' in one direction and the other clutch 63'' being fastened to the second handlebar shaft 53'' and engaging the second wall 55'' to prevent movement of the second handlebar 50b and shaft 53'' in the other direction.

Means may be provided to operate each of the clutch means 60'', 61'', 62'', and 63'' independently to permit independent and infinitely variable adjustment of each of the first and second handlebars 50a'' and 50b'' about the first and second handlebar shafts 52'' and 53''. In such means, the one-way, spring-wrap clutch means 60'', 61'', 62'', and 63'', as indicated in FIGS. 14 and 15, may include operating tabs 60a'', 61a'', 62a'', and 63a'', respectively, projecting therefrom, and adapted for operation by, a plurality of push buttons, such as 70, 71, 72, and 73 of FIG. 10. The push buttons may be mounted in and carried by a housing (similar to housing 80 shown in FIG. 6) adapted to retain the push buttons therein and to position them for engagement and operation of the tabs 60a'', 61a'', 62a'', and 63a'' of the four clutch means.

While I have shown a number of embodiments to my invention, other embodiments may be derived from the above description and drawings by those skilled in the art without departing from the scope of the claims that follow.

I claim:

1. An adjustable handlebar system comprising handlebar means to provide handle grips for a vehicle and being adapted for movement with respect to the vehicle, and at least a pair of unidirectional clutch means, each clutch means being engaged with said handlebar means and each clutch means being connected to a part of the vehicle, the clutch means and handlebar means being interconnected to prevent movement in two opposite directions and to hold the handlebar means immovable in the absence of operation of the clutches, one clutch means being operable to permit infinitely variable movement of the handlebar means in one direction and the other clutch means being operable to permit infinitely variable movement of the handlebar means in the other direction.

2. The system of claim 1 wherein said handlebar means includes a pair of handlebars connected together at the ends opposite the handle grips by a pair of gear-like elements having engaged teeth portions to which the pair of handlebars are fastened, each of said gear-like elements being fixed to gear shafts that are rotatably carried by a bracket adapted for fastening to the vehicle, one clutch means being engaged with one gear shaft to permit rotation of the gear shaft in one direction but to prevent rotation of the shaft in the other direction and the second clutch means being engaged with the other gear shaft to permit rotation of the gear shaft in said one direction but to prevent rotation of the gear shaft in the other direction, the engagement of the gears preventing movement of the handle grips in the absence of operation of either clutch means, the operation of said one clutch means, through the engagement of the gears, permitting simultaneous adjustment of the pair of handle grips in one direction and the operation of the second clutch means, through the engagement of the gears, permitting simultaneous adjustment of the pair of handle grips in the other direction.

3. An adjustable handlebar system comprising a pair of handlebars adapted for gripping at their one ends and connected together at their other ends by a pair of elements having engaged gear portions to which the handlebars are fastened, said elements each being fixed to one of a pair of gear shafts that are rotatably carried by a bracket adapted to be fastened to a vehicle, first unidirectional clutch means on one of said gear shafts to permit rotation of the shaft in one direction but to prevent rotation of the shaft in the other direction and second unidirectional clutch means on the other of said gear shafts to permit rotation of the shaft in said one direction but to prevent rotation of the shaft in the other direction, the engagement of the gears preventing movement of the handlebars without operation of either of the first or second unidirectional clutch means, the operation of said first unidirectional clutch means and the engagement of said gears permitting simultaneous adjustment of the pair of handlebars in one direction and the operation of the second undirectional clutch means and the engagement of the gears permitting adjustment of the handlebars in the other direction.

4. The adjustable handlebar system of claim 2 or claim 3 wherein said pair of engaged gear portions are carried on a pair of gear shafts having portions extending through the bracket so that the teeth of said gear portions are engaged, wherein said first and second clutch means are a pair of one-way, spring-wrap clutches, each clutch being engaged at one end with the portions of one of said gear shafts that extend through the bracket and having an operating tab projecting outwardly from the engaged end, each clutch being fastened at the other end to said bracket to prevent movement of the gear shafts and handlebars in the absence of operation of the operating tabs, and wherein said system includes a lever movably carried by the bracket and adapted to engage the operating tabs of each clutch so that movement of the lever in one direction will result in engagement and operation of the operating tab of one clutch and permit movement of the handlebars in one direction and movement of the lever in the other direction will result in engagement and operation of the operating tab of the other clutch and permit movement of the handlebars in the other direction.

5. The adjustable handlebar system of claim 2 wherein said pair of gear-like elements are spur gears, and the pair of spur gears are carried on a pair of gear shafts having parallel central axes and extending through the bracket so that the peripheral teeth of said gears are engaged, wherein each clutch means is a one-way, spring-wrap clutch rotatably carried about the central axis of one of said shafts and being engaged with a stationary part of said bracket, each clutch means having an operating tab projecting outwardly from an end thereof, said clutch means and the engagement of the gears preventing movement of the gear shafts and handlebars in the absence of operation of an operating tab, and wherein said system includes a pair of tab operators, each tab operator being carried about the central axis of one of said gear shafts so that it may rotate about and move generally in the direction of the central axis of the shaft and each tab operator having a portion extending into engagement with the operating tab for the clutch carried about the shaft so that movement of one tab operator will operate the tab of one clutch and permit simultaneous adjustment of the handlebars in one direction and movement of the other tab operator will operate the tab from the other clutch and permit simultaneous adjustment of the handlebars in the other direction.

6. The adjustment handlebar system of claim 1 wherein the handlebar means includes a pair of first and second handlebars, each handlebar being carried by a handlebar shaft, wherein a bracket is adapted for fastening to the vehicle and includes a plurality of portions to carry the handlebar shaft, and wherein said system includes, in addition to a first pair of unidirectional clutch means, a second pair of unidirectional clutch means, said first pair of clutch means being carried about the axis of the handlebar shaft with one of said first pair of clutch means interconnecting a portion of the bracket and said first handlebar to permit movement of the first handlebar in one direction and to prevent movement of the first handlebar in the other direction and the other of said first pair of clutch means, interconnecting a portion of the bracket and said first handlebar to prevent movement of the first handlebar in one direction and to permit movement of the first handbar in the other direction, said second pair of clutch means being carried about the axis of the handlebar shaft with one of said second pair of clutch means interconnecting a portion of the bracket and said second handlebar to permit movement of the second handlebar in one direction and to prevent movement of the second handlebar in the other direction and said other of the second pair of clutch means interconnecting a portion of the bracket and said second handlebar to prevent movement of the second handlebar in one direction and to permit movement of the second handlebar in the other direction, and wherein the system includes means to operate each of the clutch means to permit independent and infinitely variable adjustment of each of the first and second handlebars about the handlebar shaft.

7. The adjustable handlebar system of claim 6 wherein the handlebar means includes a pair of first and second handlebars, each handlebar being fastened to first and second handlebar shafts, and wherein said bracket includes first and second walls forming a U-shaped portion to carry said first and second handlebar shafts with said first and second handlebar shafts extending through said first and second walls, and wherein said first pair and second pair of unidirectional clutch means are four, one-way, spring-wrap clutch means, said first pair of clutch means being carried about the axis of the first handlebar shaft with one of said first pair of clutch means being fastened to said first wall of the bracket and engaging said first handlebar shaft to prevent movement of the first shaft and first handlebar in one direction, and the other of said first pair of clutch means being fastened to the second wall of the bracket and engaging said first handlebar shaft to prevent movement of the first shaft and first handlebar in the other direction, said second pair of clutch means being carried about the axis of the second handlebar shaft with one of said second pair of clutch means being fastened to said first wall of the bracket and engaging said second handlebar shaft to prevent movement of the second shaft and second handlebar in one direction and said other of the second pair of clutch means being fastened to said second wall means and engaging said second handlebar shaft to prevent movement of the second shaft and second handlebar in the other direction.

8. The adjustable handlebar system of claim 7 wherein said first and second handlebar shafts are parallel and are carried by said first and second walls of the bracket in spaced relationship, wherein said first and second walls of the bracket have a pair of aligned openings lying on an axis parallel to and between the axes of the first and second handlebar shafts, wherein each clutch means of said first and second pair of clutch means includes an operating tab extending outwardly from the clutch in spaced relationship to the aligned openings of the first and second walls of the bracket, and wherein said means to operate each of the clutch means includes an operating bar carried in the aligned openings of the first and second walls of the bracket, said operating bar having a first and second pair of operating surfaces located so that movement of the operating bar in one direction within the aligned openings moves the first pair of operating surfaces to engage the operating tabs of one clutch means on the first handlebar shaft and one clutch means on the second handlebar shaft to permit the first and second handlebars to be raised simultaneously and so that movement of the operating bar in the other direction within the aligned opening moves the second pair of operating surfaces to engage the operating tabs of the other clutch means on the first and second handlebar shafts to permit the first and second handlebars to be lowered simultaneously.

9. The adjustable handlebar system of claim 8 wherein the operating bar slides back and forth in rectangular aligned openings and is retained therein by a lever movably fastened to the bracket and passing through an opening in the operating bar, the operating tabs of the clutch means are located above and below the aligned openings of the first and second walls of the bracket and the first and second pair of operating surfaces are ramps formed on the upper and lower surfaces of the operating bar to engage and operate the operating tabs of the clutches as the operating bar slides back and forth in the bracket.

10. The adjustable handlebar system of claim 6 wherein the means to operate each of the clutch means includes four push buttons carried by the bracket so that each push button will engage an operating tab projecting from each of the clutch means.

11. The adjustable handlebar system of claim 1 wherein the handlebar means includes a pair of first and second handlebars, each handlebar being fastened to first and second handlebar shafts, wherein said bracket includes first and second walls forming a U-shaped portion to carry said first and second handlebar shafts with said handlebar shafts extending through said first and second walls, and wherein said system includes a first and second pair of one-way, spring-wrap clutch means, said first pair of clutch means being carried about the axis of the first handlebar shaft with one of said first pair of clutch means being fastened to said first wall of the bracket and engaging said first handlebar shaft to prevent movement of the first shaft and first handlebar in one direction, and the other of said first pair of clutch means being fastened to the second wall of the bracket and engaging said first handlebar shaft to prevent movement of the first shaft and first handlebar in the other direction, and said second pair of clutch means being carried about the axis of the second handlebar shaft with one of said second pair of clutch means being fastened to said first wall of the bracket and engaging said second handlebar shaft to prevent movement of the second shaft and second handlebar in one direction and said other of the second pair of clutch means being fastened to said second wall means and engaging said second handlebar shaft to prevent movement of the second shaft and second handlebar in the other direction, and wherein the system includes means to operate each of the clutch means to permit independent and infinitely variable adjustment of each of the first and second handlebars about the first and second handlebar shafts.

12. In an adjustable handlebar for a bicycle including a handlebar comprising left- and right-hand grip portions and means for mounting the handlebar for adjustable movement of the grip portions upwardly and downwardly relative to the bicycle, the improvement comprising means for controlling the positional movement of said grip portions including unidirectional clutch means interconnecting the handlebar and the means for mounting the handlebar to hold said grip portions in selected positions, and means for releasing said clutch means to permit infinitely variable adjustment of the position of the grip portion relative to the bicycle.

13. The improvement of claim 12 wherein the means for mounting the handlebar for adjustable movement includes, engaged gear means to drivingly connect said grip portions such that they move upwardly and downwardly together, said unidirectional clutch means including a first unidirectional clutch permitting free upward movement of one gripping portion and a second unidirectional clutch for permitting free downward movement of the other gripping portion, the first and second unidirectional clutches and the engaged gear means preventing adjustment of the grip portion in the absence of operation of the first and second clutches.

14. The improvement of claim 12 or claim 13 wherein said unidirectional clutch means are one-way, spring-wrap clutches.

15. An adjustable handlebar system comprising
a pair of handlebars connected together by a pair of engaged gear surfaces to which the pair of handlebars are fastened,
each of said gear surfaces being fixed to gear shafts that are rotatably carried by a bracket adapted for fastening on a vehicle,
one unidirectional clutch means being engaged with one gear shaft to permit rotation of the gear shaft in one direction but to prevent rotation of the gear shaft in the other direction and a second unidirectional clutch means being engaged with the other gear shaft to permit rotation of the other gear shaft in said one direction but to prevent rotation of the gear shaft in the other direction, the engagement of the gears preventing movement of the handle grips without operation of either unidirectional clutch means, the operation of said one clutch means and the engagement of the gears permitting simultaneous adjustment of the pair of handlebars in one direction and the operation of the second clutch means and the engagement of the gears permitting simultaneous adjustment of the handlebars in the other direction.

16. An adjustable handlebar system comprising
a pair of handlebars interconnected through a pair of spur gears, said pair of spur gears being carried on a pair of shafts with parallel central axes that extend through a bracket for a velocipede with the peripheral teeth of said gears being engaged,
a pair of unidirectional clutch means, each clutch means being carried about the central axis of one of said shafts with one clutch means interconnecting a part of the bracket and one shaft and the other clutch means interconnecting a part of the bracket and the other shaft,
operating tabs for the clutch means, said clutch means and the engagement of the gears preventing movement of the shafts and the handlebars in the absence of operation of the operating tabs,
said system including a pair of tab operators, each tab operator being slidably carried adjacent the central axis of one of the shafts and having a portion extending into engagement with the operating tab for the clutch means carried about that shaft so that movement of one tab operator will operate the tab of one clutch and permit simultaneous adjustment of the handlebars in one direction and movement of the other tab operator will operate the other clutch and permit simultaneous adjustment of the handlebars in the other direction.

17. An adjustable handlebar system comprising
a pair of first and second handlebars, each handlebar being fastened to one of a pair of first and second handlebar shafts,
a bracket including first and second walls forming a U-shaped portion to carry said first and second handlebar shafts with said first and second handlebar shafts extending through said first and second walls, and
a first and second pair of unidirectional clutch means,
said first pair of unidirectional clutch means being carried about the axis of the first handlebar shaft with one of said first pair of clutch means interconnecting said first wall of the bracket and said first handlebar shaft to prevent movement of the first shaft and first handlebar in one direction, and the other of said first pair of clutch means interconnecting the second wall of the bracket and said first handlebar shaft to prevent movement of the first shaft and first handlebar in the other direction, and
said second pair of clutch means being carried about the axis of the second handlebar shaft with one of said second pair of clutch means interconnecting said first wall of the bracket and said second handlebar shaft to prevent movement of the second shaft and second handlebar in one direction and said other of the second pair of clutch means interconnecting said second wall means and said second handlebar shaft to prevent movement of the second shaft and second handlebar in the other direction.

18. The adjustable handlebar system of claim 17 wherein
said first and second handlebar shafts are parallel and are carried by said first and second walls of the bracket in spaced relationship, and said first and second walls of the bracket have a pair of aligned openings lying in an axis parallel to and between the axes of the first and second handlebar shafts,
wherein each unidirectional clutch means of said first and second pair of clutch means is a one-way, spring-wrap clutch including an operating tab extending outwardly from each clutch in spaced relationship to the aligned openings of said first and second walls of the bracket, and
wherein an operating bar is carried in the aligned openings of the first and second walls of the bracket,
said operating bar having a first and second pair of operating surfaces located so that movement of the operating bar in one direction within the aligned openings moves the first pair of operating surfaces to engage the operating tabs of one clutch means on the first handlebar shaft and one clutch means on the second handlebar shaft to permit the first and second handlebars to be raised simultaneously and so that movement of the operating bar in the other direction within the aligned opening moves the second pair of operating surfaces to engage the operating tabs of the other clutch means on the first and second handlebar shafts to permit the first and second handlebars to be lowered simultaneously.

19. The adjustable handlebar system of claim 18 wherein the operating bar slides back and forth in rectangular aligned openings and is retained therein by a lever movably fastened to the bracket and passing through an opening in the bar, and the first and second pair of surfaces are ramps formed on the upper and lower surfaces of the operating bar to engage and operate the operating tabs of the spring-wrap clutches as the operating bar slides back and forth in the bracket.

20. An adjustable handlebar system comprising
- a pair of handlebars adapted for gripping at their one ends and connected together at their other ends by a pair of elements having engaged gear portions to which the handlebars are fastened,
- each of said elements being fixed to a gear shaft and being rotatably carried by a bracket adopted for fastening to a bicycle,
- a first one-way, spring-wrap clutch on one of said gear shafts to permit rotation of the shaft in one direction but to prevent rotation of the shaft in the other direction and a second one-way, spring-wrap clutch on the other shaft to permit rotation of the shaft in said one direction but to prevent rotation of the shaft in the other direction, each of the first and second spring-wrap clutches including an operating tab to disengage the clutch from its associated shaft,
- the engagement of the gears preventing movement of the handlebars without operation of either the first or second spring-wrap clutches, a lever movably carried by the bracket and adapted to engage the operating tabs of each clutch so that movement of the lever in one direction will result in engagement and operation of the tab of the first spring-wrap clutch and permit simultaneous movement of the handlebars in one direction and movement of the lever in the other direction will result in engagement and operation of the tab of the other clutch and permit simultaneous movement of the handlebars in the other direction.

* * * * *